United States Patent
Meillan

(10) Patent No.: US 10,648,537 B2
(45) Date of Patent: May 12, 2020

(54) WALL AND/OR CEILING MOUNT FOR A FASTENING ROPE

(71) Applicant: La Siesta GmbH, Jugenheim (DE)

(72) Inventor: Jean-Christophe Meillan, Ingelheim (DE)

(73) Assignee: LA SIESTA GMBH, Jungenheim (DE)

( * ) Notice: Subject to any disclaimer, the term of this patent is extended or adjusted under 35 U.S.C. 154(b) by 0 days.

(21) Appl. No.: 15/962,403

(22) Filed: Apr. 25, 2018

(65) Prior Publication Data

US 2019/0331198 A1    Oct. 31, 2019

(51) Int. Cl.
*A45F 3/24*    (2006.01)
*F16G 11/14*   (2006.01)

(52) U.S. Cl.
CPC .............. *F16G 11/143* (2013.01); *A45F 3/24* (2013.01)

(58) Field of Classification Search
CPC .... Y10T 24/3916; Y10T 24/3991; A45F 3/24; F16G 11/046; F16G 11/143
USPC ....................................................... 248/217.2
See application file for complete search history.

(56) References Cited

U.S. PATENT DOCUMENTS

| | | | | |
|---|---|---|---|---|
| 317,350 A | * | 5/1885 | Hasskarl ................. | F16G 11/00 24/129 R |
| 533,193 A | * | 1/1895 | Granger ................. | B63B 21/045 114/218 |
| 1,284,799 A | * | 11/1918 | Sindelar .................... | F16L 3/04 174/166 R |
| 1,691,412 A | * | 11/1928 | Ruetz ...................... | A47K 10/12 211/16 |
| 1,813,482 A | * | 7/1931 | Chance ................... | E04H 12/20 24/115 K |
| 1,855,564 A | * | 4/1932 | Williams ................ | F16G 11/06 24/115 K |
| 2,288,439 A | * | 6/1942 | Dahm ...................... | A47G 1/20 248/217.2 |
| 2,643,428 A | * | 6/1953 | Jenne ...................... | E04H 12/20 24/115 K |
| 2,940,712 A | * | 6/1960 | Lloyd-Young ........... | A47G 1/20 248/217.2 |
| 2,983,010 A | * | 5/1961 | Huggins ................. | E04H 12/20 24/115 K |
| 3,398,714 A | * | 8/1968 | Kock ...................... | B63B 21/08 114/218 |

(Continued)

FOREIGN PATENT DOCUMENTS

DE    202011105043 U1    5/2012
DE    202013104457 U1    12/2013

*Primary Examiner* — Bradley Duckworth
(74) *Attorney, Agent, or Firm* — Hauptman Ham, LLP

(57) ABSTRACT

A wall and/or ceiling mount for receiving a fastening rope. The wall and/or ceiling mount comprises receptacles and angled receptacles for affixing the wall and/or ceiling mount, angled receptacles, and a fastening region for the releasable fastening of the rope. The wall and/or ceiling mount has a receiving opening formed therein which is arranged on a lower side between two receptacles and is spanned by a curved connecting region. An outlet opening in the rope guide running in the wall and/or ceiling mount is arranged frontally and approximately centrally on the wall and/or ceiling mount. Above said outlet opening, a further receptacle forms a fastening region on which the loop end rests. A mount at said fastening region secures the loop end which is layable releasably thereon.

13 Claims, 10 Drawing Sheets

(56) References Cited

U.S. PATENT DOCUMENTS

| | | | | |
|---|---|---|---|---|
| 3,465,391 A | * | 9/1969 | Armstrong | F16G 11/103 |
| | | | | 114/218 |
| 3,520,004 A | * | 7/1970 | Patnaude | E04H 4/10 |
| | | | | 24/129 R |
| 3,715,782 A | * | 2/1973 | Newell | F16G 11/103 |
| | | | | 24/116 R |
| 3,928,889 A | * | 12/1975 | Wartian | E05C 17/36 |
| | | | | 16/74 |
| 4,040,149 A | * | 8/1977 | Einhorn | A47G 1/20 |
| | | | | 248/493 |
| 4,863,135 A | * | 9/1989 | Mellor | A47G 1/18 |
| | | | | 248/328 |
| 9,277,802 B2 | * | 3/2016 | Meillan | A45F 3/22 |
| 2005/0035264 A1 | | 2/2005 | Marks | |
| 2011/0085874 A1 | | 4/2011 | Davidowitch | |
| 2014/0237774 A1 | * | 8/2014 | Kline | F16G 11/046 |
| | | | | 24/129 R |

\* cited by examiner

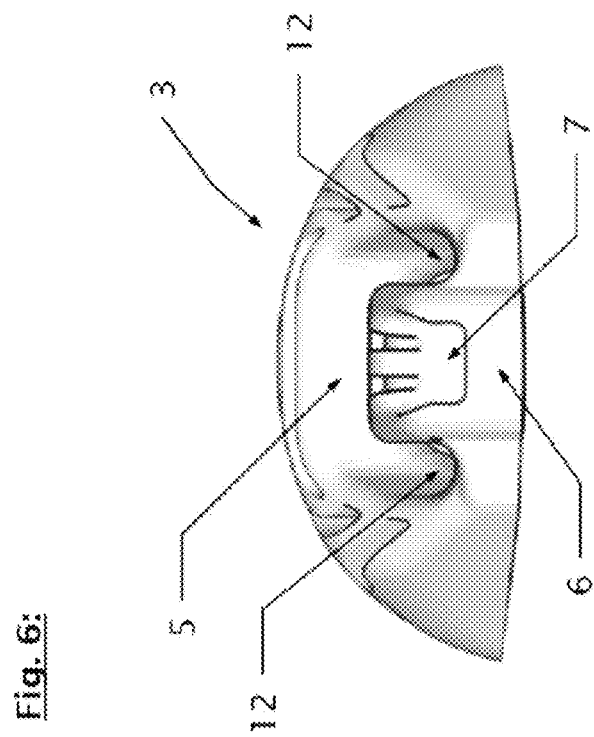
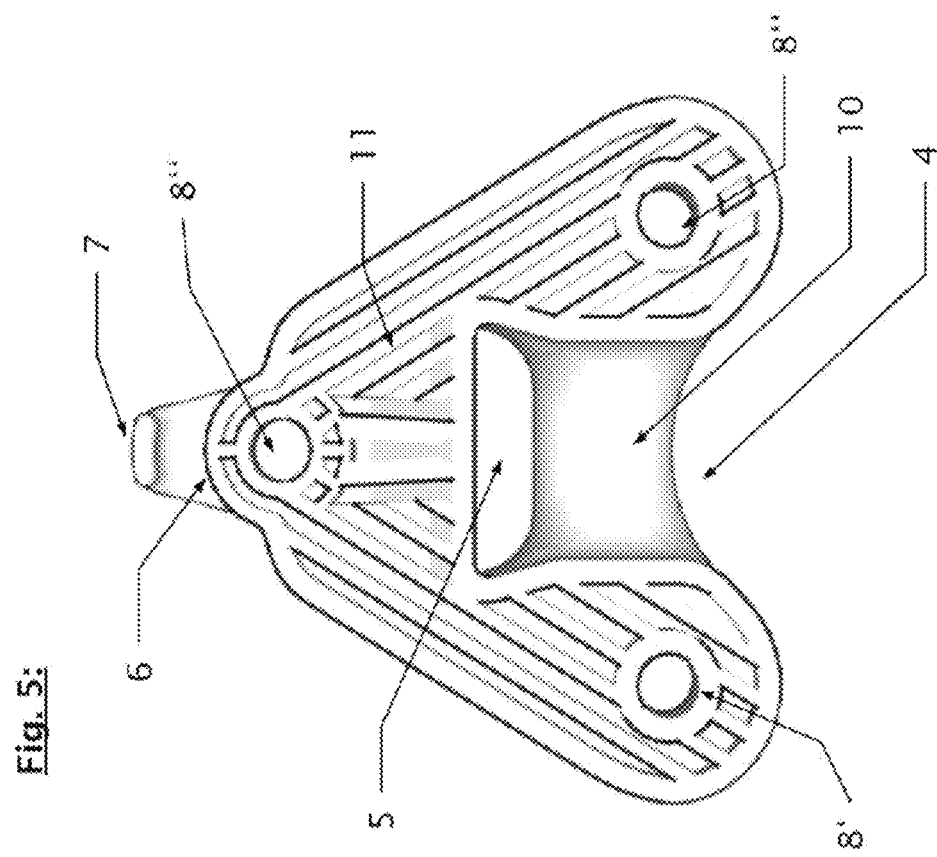

WALL AND/OR CEILING MOUNT FOR A FASTENING ROPE

BACKGROUND

One or more embodiments according to the present invention relate to a wall and/or ceiling mount for a fastening rope to which a body which is to be suspended is fastened.

It is becoming increasingly popular in the domestic sphere and also indoors and in the garden to releasably fasten objects by means of fastening ropes. For example, it can be increasingly found that hammocks or else hanging seats are fastened not only to and between trees, but also inside rooms in order thus to be able to enjoy said sitting and reclining devices in the domestic environment too. Awnings which in the meantime are also fastened releasably on houses as an alternative to the widely used arrangement of blinds are a further example.

It is well known also to arrange hammocks in rooms on special hammock stands, but this involves comparatively bulky items of furniture, the construction and removal of which are rather complicated. In addition, hanging seats which are suspended, for example, on a ceiling hook are also becoming increasingly popular in the domestic sphere.

It should basically be taken into consideration that, specifically for hammocks or else hanging seats, the fastening means have to support severe weight loads, and therefore particular requirements have to be imposed here on fastening means. Fastenings are widely used where fastenings are realized merely using commercially available hooks plugged into the wall and eyes, the fastenings taking place, for example, by means of spring hooks on said wall fastenings. Since, however, these involve fastening means which cannot easily be removed without further ado, consideration has already been given to designing special fastening means for wall and ceiling mounts of this type.

BRIEF DESCRIPTION OF THE DRAWINGS

The subject matter of one or more embodiments of the invention will be described in more detail below with reference to a plurality of drawings, in which

FIG. 5 shows the wall and/or ceiling mount in a rear view;

FIG. 6 shows the wall and/or ceiling mount in a top view;

DETAILED DESCRIPTION

Figure 1:
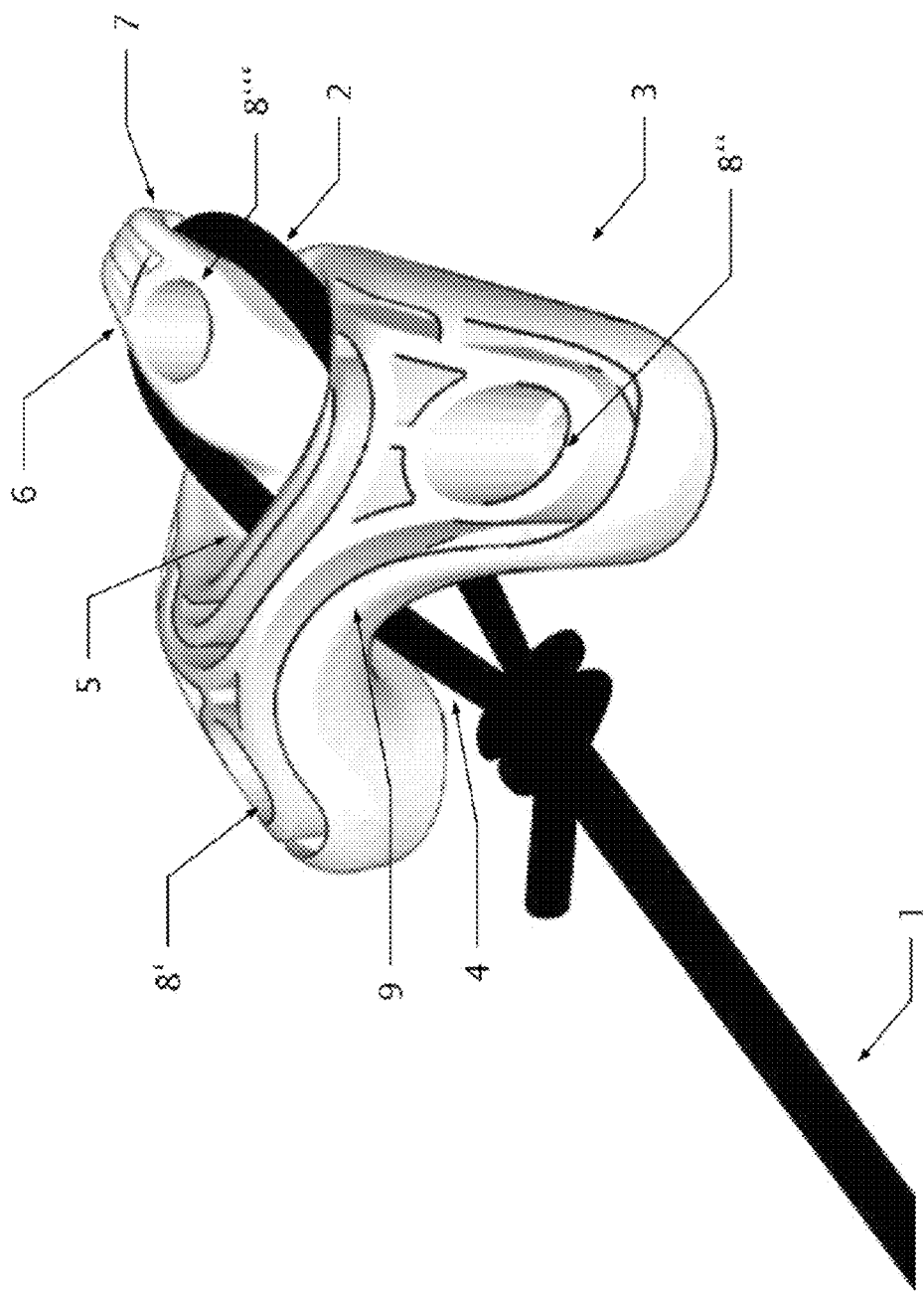
FIG. 1 shows the wall and/or ceiling mount with an inserted loop end of a fastening rope in the use state.

The figures accordingly show the wall and/or ceiling mount from various perspectives. FIG. 1 is shown here to illustrate the application situation with an introduced rope. It can be seen here that the rope 1 which is to be fastened has, at its free end, a loop 2 with which said rope 1 can be suspended on the wall and/or ceiling mount.

For this purpose, the wall and/or ceiling mount 3 has a wide receiving opening 4 through which the loop end 2 is introduced into the wall. Accordingly, the loop end 2 enters on the lower side into the wall mount 3 and is then pushed in a guide channel through the wall mount to the outlet opening 5 and thus re-emerges centrally from the wall mount. The loop end 2 is then placed over a fastening region 6, for which purpose said loop end is guided over a retaining lug 7 and laid onto the fastening region 6.

In the present structural form, the wall and/or ceiling mount 3 here has three receptacles 8 for fastening screws, wherein said receiving regions are selected in such a manner that an ideal support of the wall mount takes place during the force absorption due to the tensile loading of the rope.

Figure 4:
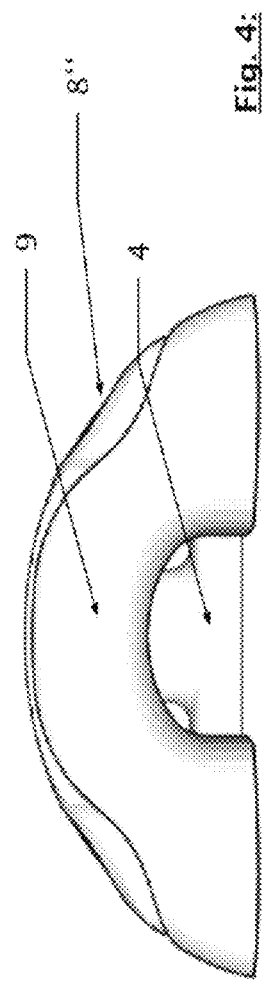
FIG. 4 shows the wall and/or ceiling mount in a lower view.

There are firstly in this case the screw receptacles 8' and 8" which are arranged to the side of the receiving opening 4 for the loop end 2. Extending from said regions is a curved connecting region 9 which forms the receiving opening 4 together with the fastening regions of the screws. It is apparent here, in particular from FIG. 4, that said region is of curved design and the opening here is formed from the lateral walls of the screw receptacles 8' and 8" and the curved connecting region 9 and the rear wall. That is to say, the guide channel 10 for the rope loop 2 is formed by the fastening wall or ceiling, with it alternatively also being possible for a rear wall to be arranged on the wall and/or ceiling mount 3 in this region.

Figure 2:
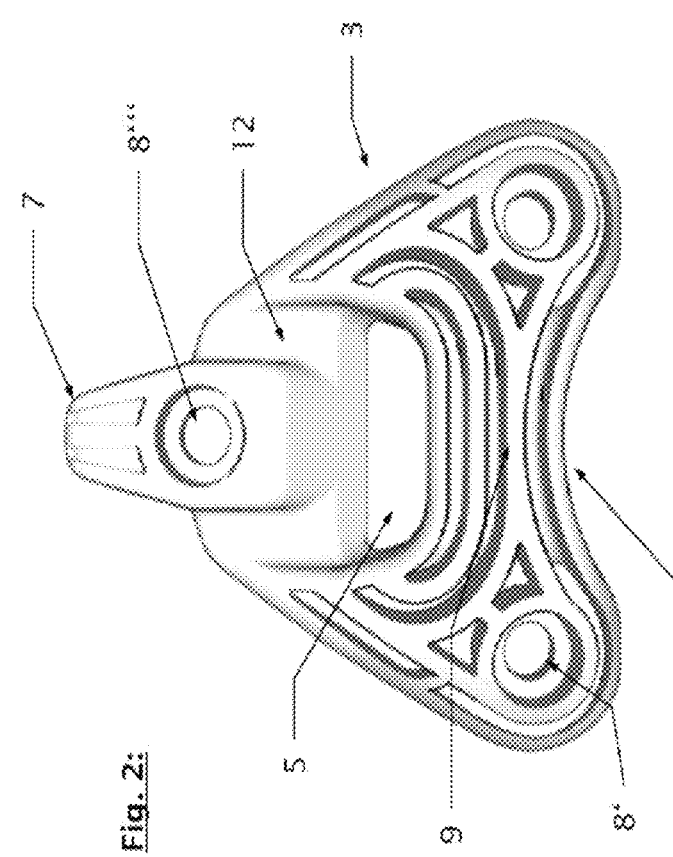
FIG. 2 shows the wall and/or ceiling mount in a frontal view.

FIG. 2 illustrates, in the frontal view, the arrangement of the screw receptacles 8 in a triangular arrangement. The two lower screw receptacles 8' and 8", which lie on one level, are arranged here to the side of the receptacle 4 for the rope end 2. The outlet opening 5 for the loop end 2 is illustrated in the center of the wall and/or ceiling mount 3, said outlet opening likewise being of wide design, in order to permit easy introduction and grasping of the loop end 2 by the user. Located above said outlet opening 5 is the fastening region 6 for the loop end 2, said fastening region leading on the upper side into a retaining lug 7.

Figure 3:
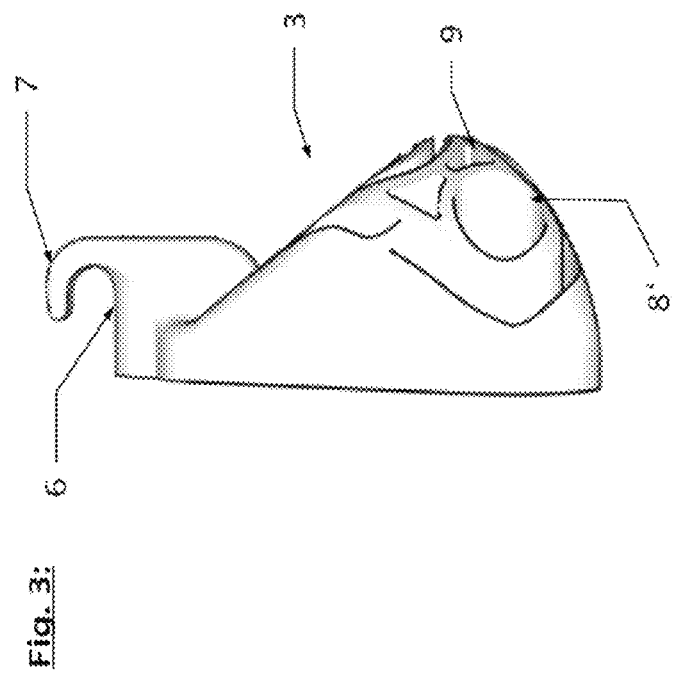
FIG. 3 shows the wall and/or ceiling mount in a lateral view.

Said retaining lug 7 is illustrated in a lateral view in FIG. 3 with the fastening region 6. The loop end 2 accordingly emerges centrally from the outlet opening 5 of the wall and/or ceiling mount 3 and is laid over the retaining lug 7. In the embodiment present here, the retaining lug 7 is of approximately U-shaped design, as a result of which the inserted loop end 2 is retained both in the vertical direction and in the horizontal direction.

However, it is clearly apparent here from FIG. 3 in conjunction with FIG. 1 that the retaining lug 7 is not loaded by the main portion of the tensile force of the rope 1, since the pulling direction of the rope 1 on the loop end 2 runs parallel to the fastening wall and is therefore conducted directly into the fastening region 6 of the wall and/or ceiling mount 3 without the retaining lug 7 having to support relatively large forces. In particular in the arrangement as a wall mount, the tensile forces are therefore conducted primarily parallel to the wall into the screws guided in the upper screw receptacle 8'''.

It is apparent from FIG. 3 and FIG. 6 that a gap is formed between the retaining lug 7 and the fastening wall, into which the loop end 2 is lifted in order to come to rest on the fastening region 6. It is thereby ensured that the loop end 2 cannot unintentionally slide away from the fastening region 6 of the wall and/or ceiling mount 3.

Finally, FIG. 5 illustrates the course of the guide channel 10 in the wall and/or ceiling mount 3. It is apparent that the central region of the wall-mount rear surface 11, which is provided with stiffening strips and bears flat against the wall, has a cutout which is spanned by the curved connecting region 9. The receptacle is arranged here on the lower side between the screw receptacles 8' and 8" and, together with the fastening wall (not illustrated), forms a guide channel 10 which leads into an outlet opening 5 in the center of the wall mount. The loop end introduced here can then be laid over the retaining lug 7 onto the fastening region 6, which is secured centrally by a fastening screw in the receptacle 8'''. In particular, said screw guidance in the fastening region 7 through the receptacle 8''' makes an elemental contribution to the stabilization of the wall and/or ceiling mount 3.

It is illustrated here in the lateral illustration of FIG. 3 that the screw receptacle 8''' is arranged in a significantly projecting manner on the wall and/or ceiling mount 3 above the outlet opening 5 in order to have a depth and stability which can form the fastening region 6. The result of this is that set-back guide regions 12 run laterally next to said screw receptacle 8''', which forms the fastening region 6, in which guide regions the rope sections forming the loop end 2 run.

Figure 7:
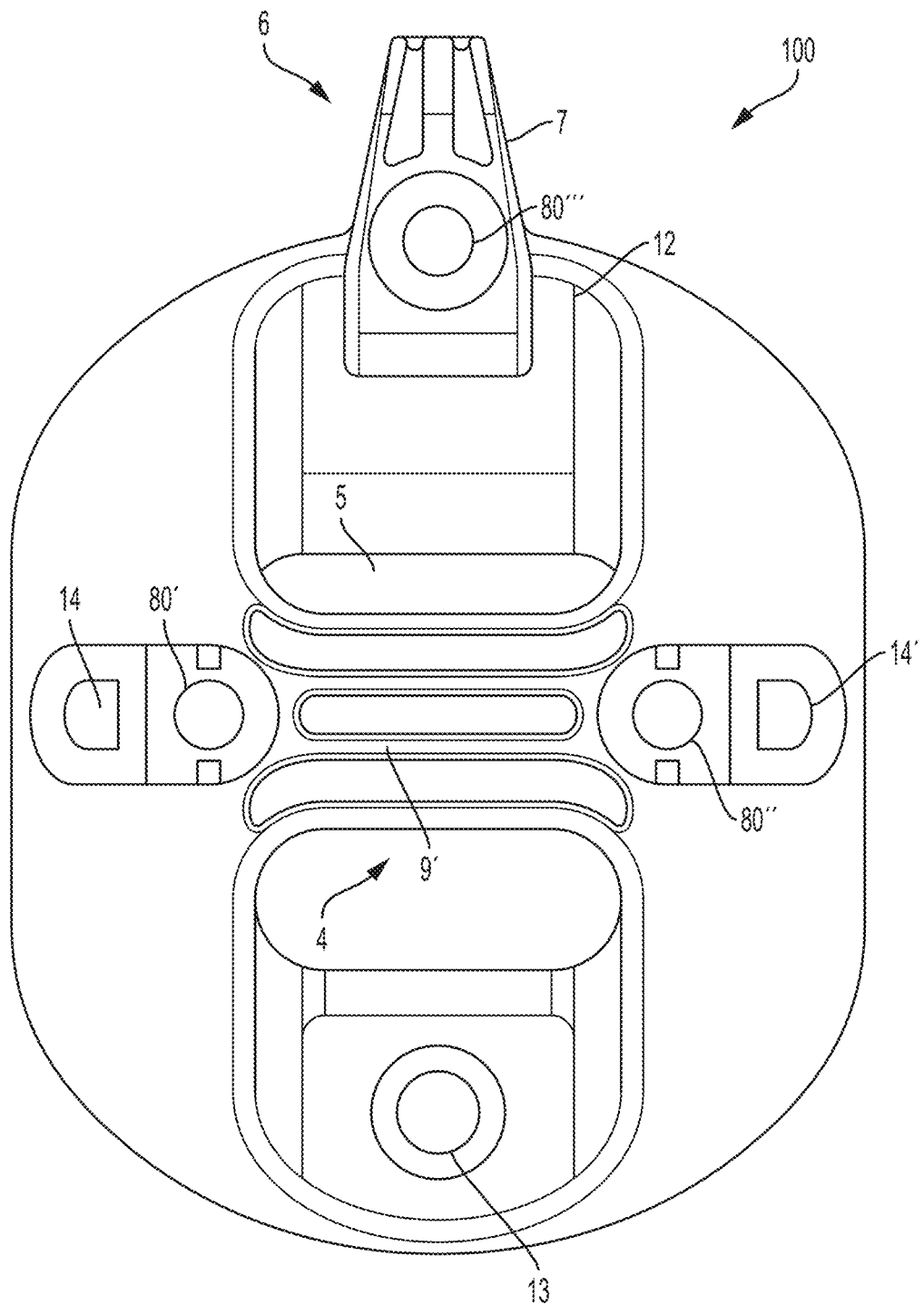
FIG. 7 is a frontal view of an other embodiment of the wall and/or ceiling mount.

FIG. 7 is a frontal view of an other embodiment of a wall and/or ceiling mount, hereinafter referred to as mount 100. Mount 100 is similar to wall and/or ceiling mount 3. Mount 100 is also usable as a wall and/or ceiling mount.

Mount 100 has a rounded rectangular shape in the frontal view with a protruding or bulging upper and lower portion.

Mount also forms a receptacle 4 for receiving rope 2 therethrough. Mount also comprises an outlet opening 5 in the center of the mount. Mount 100 also comprises a fastening region 6 similar to wall and/or ceiling mount 3.

Mount 100 also comprises a retaining lug 7 located at at least one end of the mount. In some embodiments, mount 100 includes a retaining lug 7 at opposite ends of the mount.

Mount 100 also comprises receptacles 80', 80", and 80''' for receiving a fastener similar to receptacles 8', 8", and 8''' (FIG. 1). In some embodiments, the fastener is a screw, nail, bolt, wall anchor, or other similar fastening device. Mount 100 includes an additional receptacle 13 for receiving a fastener. Receptacle 13 is positioned at a lower end of mount 100 opposite the end having receptacle 80''' and retaining lug 7. In some embodiments having a second retaining lug, receptacle 13 is positioned in the second retaining lug in a manner similar to receptacle 80'''. Receptacles 80', 80", 80''', and 13 extend from a front face of mount 100 through to a rear face of the mount. Receptacles 80', 80", 80''', and 13 extend perpendicular to the rear face of mount 100. In some embodiments, receptacles 80', 80", 80''', and 13 extend perpendicular to the front face of mount 100. Receptacles 80' & 80" and 80''' & 13 have different diameter openings for receiving different diameter fasteners. In some embodiments, three or more of receptacles 80', 80", 80''', and 13 have the same diameter openings. In some embodiments, none of receptacles 80', 80", 80''', and 13 have the same diameter openings. In some embodiments, mount 100 lacks receptacle 13.

Mount 100 also comprises a curved connecting region 9' similar to curved connecting region 9 of FIG. 1. Due to the differing body shape of mount 100, curved connecting region 9' differs from curved connecting region (FIG. 1) and is centrally located between receptacles 80' and 80".

Mount 100 also comprises guide channels similar to guide channel 10 (FIG. 5) and a rear surface similar to rear surface 11 (FIG. 5) of wall and/or ceiling mount 3.

Mount 100 also comprises set-back guide regions 12 similar to set-back guide regions 12 of wall and/or ceiling mount 3 (FIG. 1).

Similar to wall and/or ceiling mount 3, mount 100 is usable to receive and suspend rope 1 from a wall and/or ceiling.

Differing from wall and/or ceiling mount 3, mount 100 comprises an additional pair of angled receptacles 14 and 14' for receiving a fastener similar to receptacles 80', 80", 80''', and 13. Angled receptacles differ from the receptacles 8', 8", and 8''' in that the angled receptacles extend at an angle with respect to rear surface and/or front surface of mount 100 which is neither perpendicular to nor parallel with the rear surface and/or the front surface. In some embodiments, angled receptacles are at an angle other than zero (0) degrees with respect to the rear surface and ninety (90) degrees with respect to the rear surface. The fastener is used to affix mount 100 to a wall and/or ceiling. Similarly, in some embodiments, the fastener is a screw, nail, bolt, wall anchor or other similar fastening device.

Angled receptacles 14 and 14' are correspondingly located adjacent receptacles 80' and 80". Angled receptacles 14 and 14' are located between receptacles 80' and 80" and a corresponding outer edge of mount 100. In particular, angled receptacle 14 is located adjacent and between receptacle 80' and an outer left edge of mount 100 and angled receptacle 14' is located adjacent and between receptacle 80" and an outer right edge of mount 100. In some embodiments, mount 100 does not include one or both of receptacles 80' and 80" and thus angled receptacles 14 and 14' are located adjacent a corresponding outer edge of mount 100.

Angled receptacles 14 and 14' extend from a front face of mount 100 through to a rear face of the mount, similar to receptacles 8', 8", 8''', and 13. However, angled receptacles 14 and 14' extend at an angle different from perpendicular to the rear face of mount 100. In some embodiments, angled receptacles 14 and 14' extend through mount 100 at an angle ranging from 15-75 degrees with respect to the rear face of the mount. In some embodiments, each of angled receptacles 14 and 14' extend through mount 100 at a same angle. In some embodiments, each of angled receptacles 14 and 14' extend through mount 100 at a different angle.

In some embodiments, angled receptacles 14 and 14' extend through mount 100 at an angle ranging from 30-60 degrees with respect to the rear face of the mount. In some embodiments, angled receptacles 14 and 14' extend through mount 100 at an angle of 45 degrees with respect to the rear face of the mount. In some embodiments, angled receptacles 14 and 14' extend through mount 100 at an angle of 60 degrees with respect to the rear face of the mount. Larger angles for angled receptacles 14 and 14' increases the ease of installing a fastener into the angled receptacle and into a wall and/or ceiling.

Greater or lesser angles for angled receptacles 14 and 14' are usable in some embodiments.

Angled receptacles 14 and 14' extend through mount 100 at an angle such that a centerline through each angled receptacle intersects the other centerline at a point below the rear face of mount 100. In at least some embodiments, the centerline intersection is visible in an end-on view of mount 100. That is, in a given embodiment in a side view, the centerlines do not intersect even though in the end-on view, i.e, from the top of bottom of mount 100, the centerlines appear to intersect. The center of the opening corresponding to the intersection of receptacle 14 with the rear face of mount 100 is separated from the center of the opening corresponding to the intersection of receptacle 14' with the rear face of the mount by a separation distance Sd. In some embodiments, separation distance Sd ranges from 1.5 to 2.75 inches in length. In some embodiments, separation distance Sd is greater or less than from 1 to 3 inches.

In some embodiments, the centerline of opposing angled receptacles on either side of and extending through mount 100 intersect when viewed in a same plane. The intersection of the centerlines forms an angle ranging from 15 to 165 degrees. In some embodiments, the intersection of the centerlines forms an angle ranging from 60-120 degrees. In some embodiments, the intersection of the centerlines forms an angle of 90 degrees. As the intersection angle increases, the difficulty of installing fasteners increases in some embodiments. As the intersection angle decreases, the possibility of the fasteners missing engagement of a wall or ceiling support behind the mount increases By having angled receptacles 14 and 14', mount 100 is usable in conjunction with stud wall (or ceiling) construction in which spaced apart supports having a predetermined width are used to construct a wall (or ceiling) support. In some embodiments, the predetermined width is 2 inches. In some embodiments, the predetermined width is 1.5 inches. In some embodiments, the predetermined width is greater or lesser than 1.5 or 2 inches. Using angled receptacles 14 and 14', enables fasteners protruding through the receptacles 14 and 14' to extend at an angle into a stud or wall (or ceiling) support and provide greater strength to mount 100 affixed to a wall or ceiling. In this manner, angled receptacles 14 and 14' are able to be used to have fasteners attach mount 100 to a support whereas receptacles 80' or 80" would either be too widely spaced to interact with a support or be too widely spaced to fully interact with a support. Thus, a stronger affixation of mount 100 to narrower supports is possible using angled receptacles 14 and 14'.

In some embodiments, angled receptacles 14 and 14' are vertically offset from each other such that a horizontal line across curved connecting region 9 would not intersect both angled receptacles. In some embodiments, angled receptacles 14 and 14' are spaced at a different distance from an upper edge of mount 100. In some embodiments, mount 100 comprises only a single angled receptacle 14 or 14'. In some embodiments, mount 100 comprises greater than two angled receptacles. In some embodiments, one or the other of receptacles 80''' or 13 are angled receptacles.

Figure 8B:
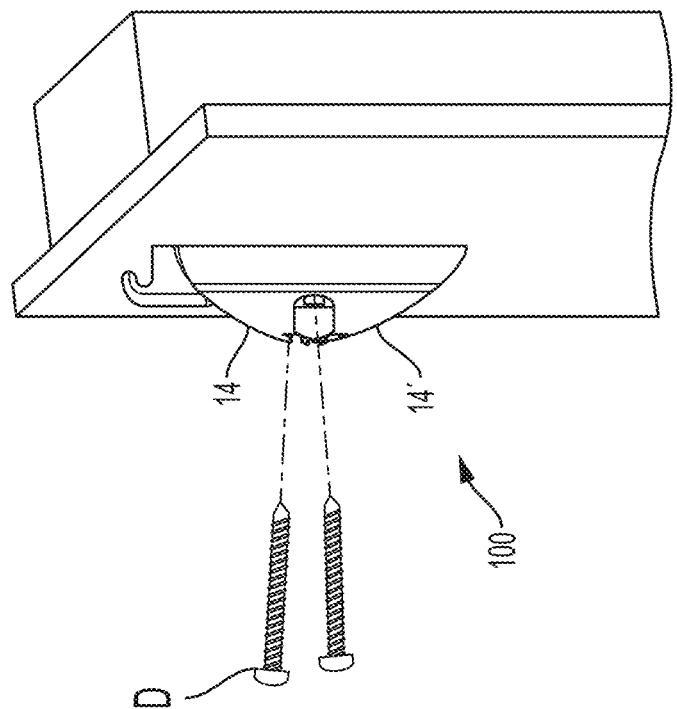
FIGS. 8a and 8b are side views of the other embodiment of the wall and/or ceiling mount.
Figure 8A:
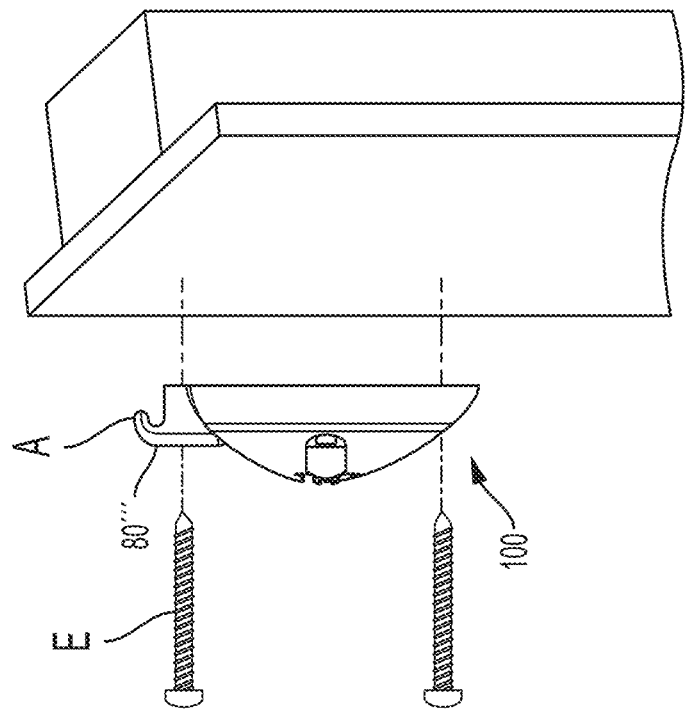

FIGS. 8a and 8b are side views of the other embodiment of the wall and/or ceiling mount. In FIG. 8a, receptacle 80''' and 13 are depicted as receiving fasteners for affixing the upper and lower portion of mount 100 to a wall having a wall support behind it. Because receptacles 80''' and 13 are vertically aligned, fasteners passing through the receptacles, with the receptacles aligned with a wall support behind the wall, extend into the wall support. FIG. 8b depicts fasteners aligned to be placed into receptacles 14 and 14' and into the wall support at an angle.

Figure 8D:
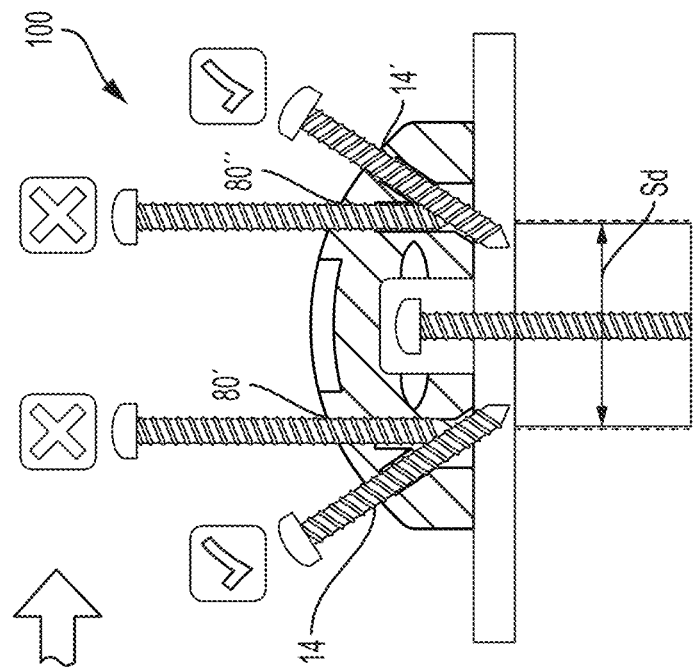
FIGS. 8c and 8d are cross section views of the other embodiment of the wall and/or ceiling mount.
Figure 8C:
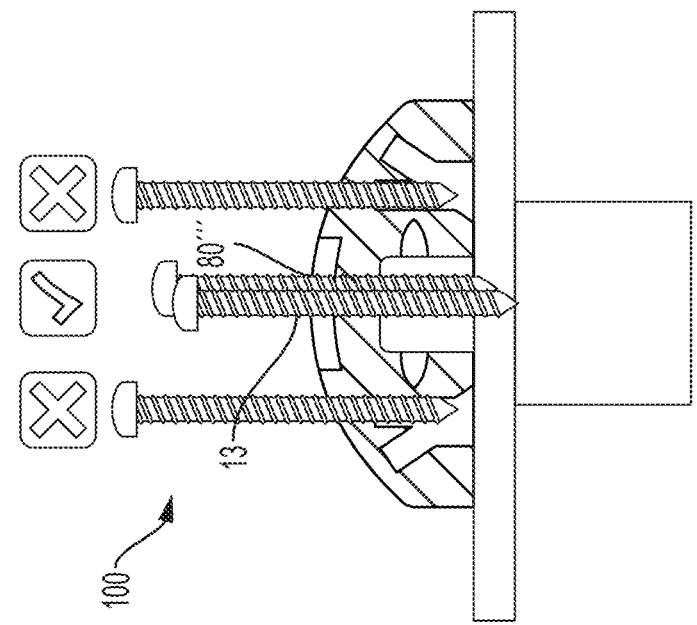

FIGS. 8c and 8d are cross section views of the other embodiment of the wall and/or ceiling mount. FIG. 8c is a view of fasteners being inserted into receptacles 80''' and 13 of mount 100. FIG. 8c also is a view indicating that receptacles 80' and 80" are not to have fasteners inserted therethrough. As depicted, inserting fasteners through receptacles 80' and 80" would not result in the fasteners interacting with the wall support. FIG. 8d is a view of fasteners 80''' and 13 fully inserted into mount 100 and the wall support. FIG. 8d also depicts fasteners being inserted into angled receptacles 14 and 14' and extending toward the wall support. After being fully inserted in angled receptacles 14 and 14', the fasteners will interact more securely with the wall support than if the fasteners had proceeded to be inserted in receptacles 80' and 80" of FIG. 8c.

Figure 9:
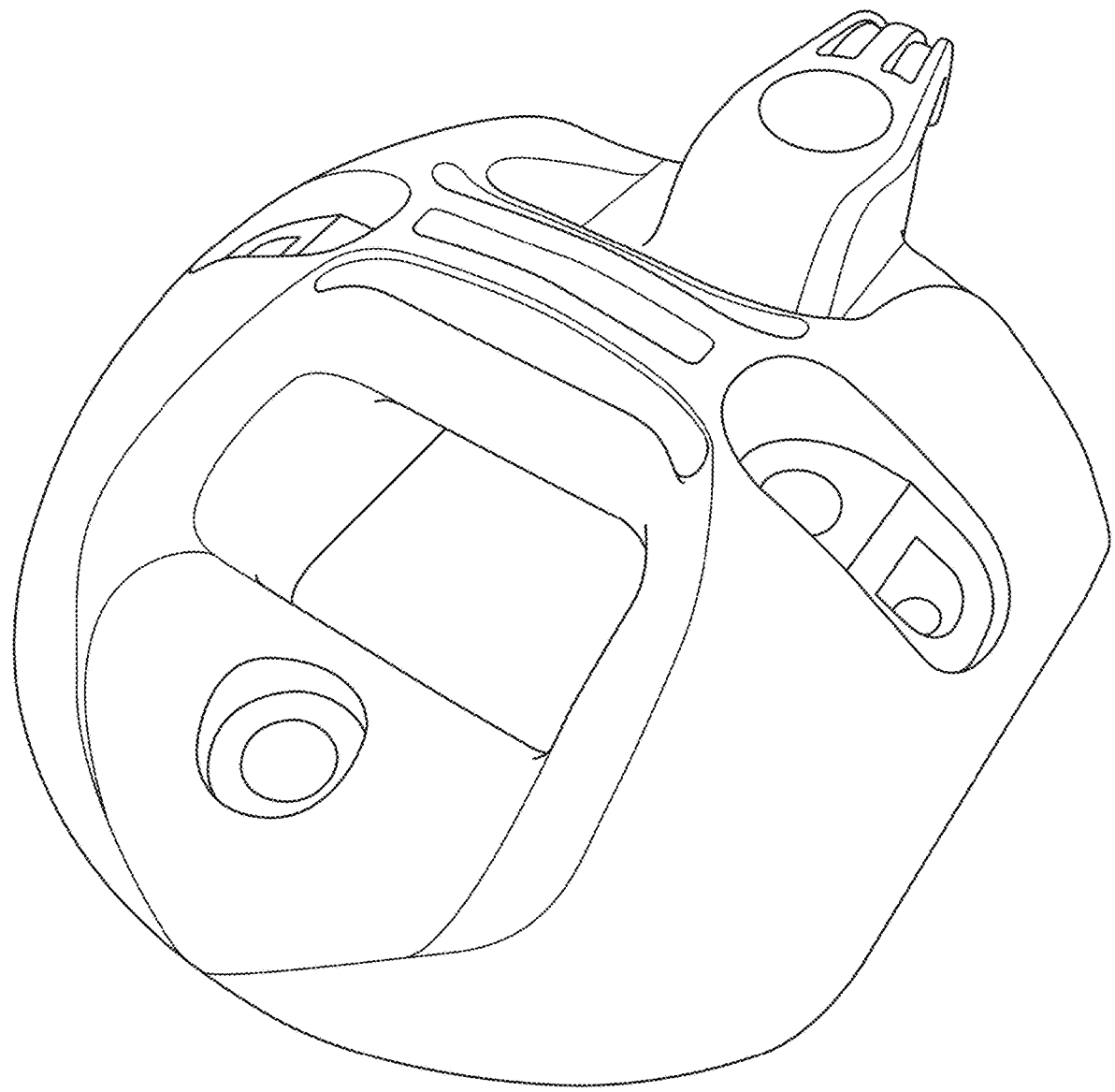
FIG. 9 is a perspective view of the other embodiment of the wall and/or ceiling mount in use.
Figure 10:
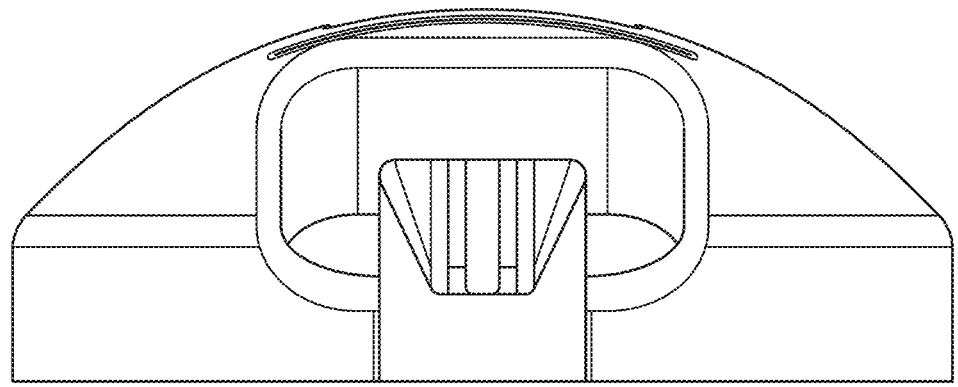
FIG. 10 is a top view of the other embodiment of the wall and/or ceiling mount.
Figure 11:
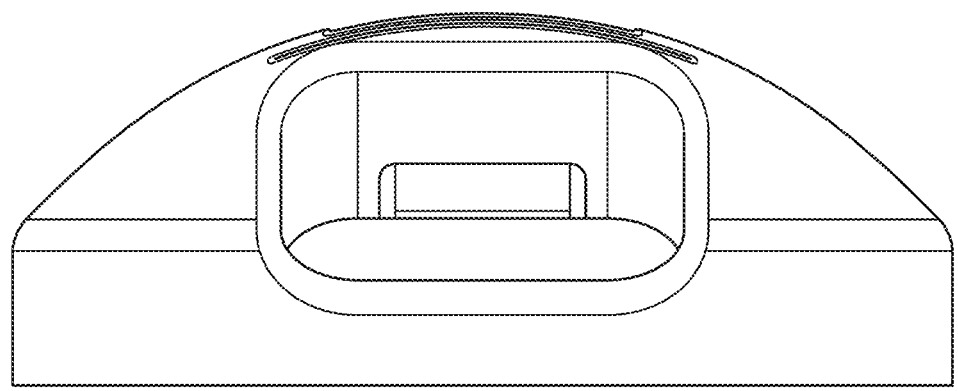
FIG. 11 is a bottom view of the other embodiment of the wall and/or ceiling mount.
Figure 12:
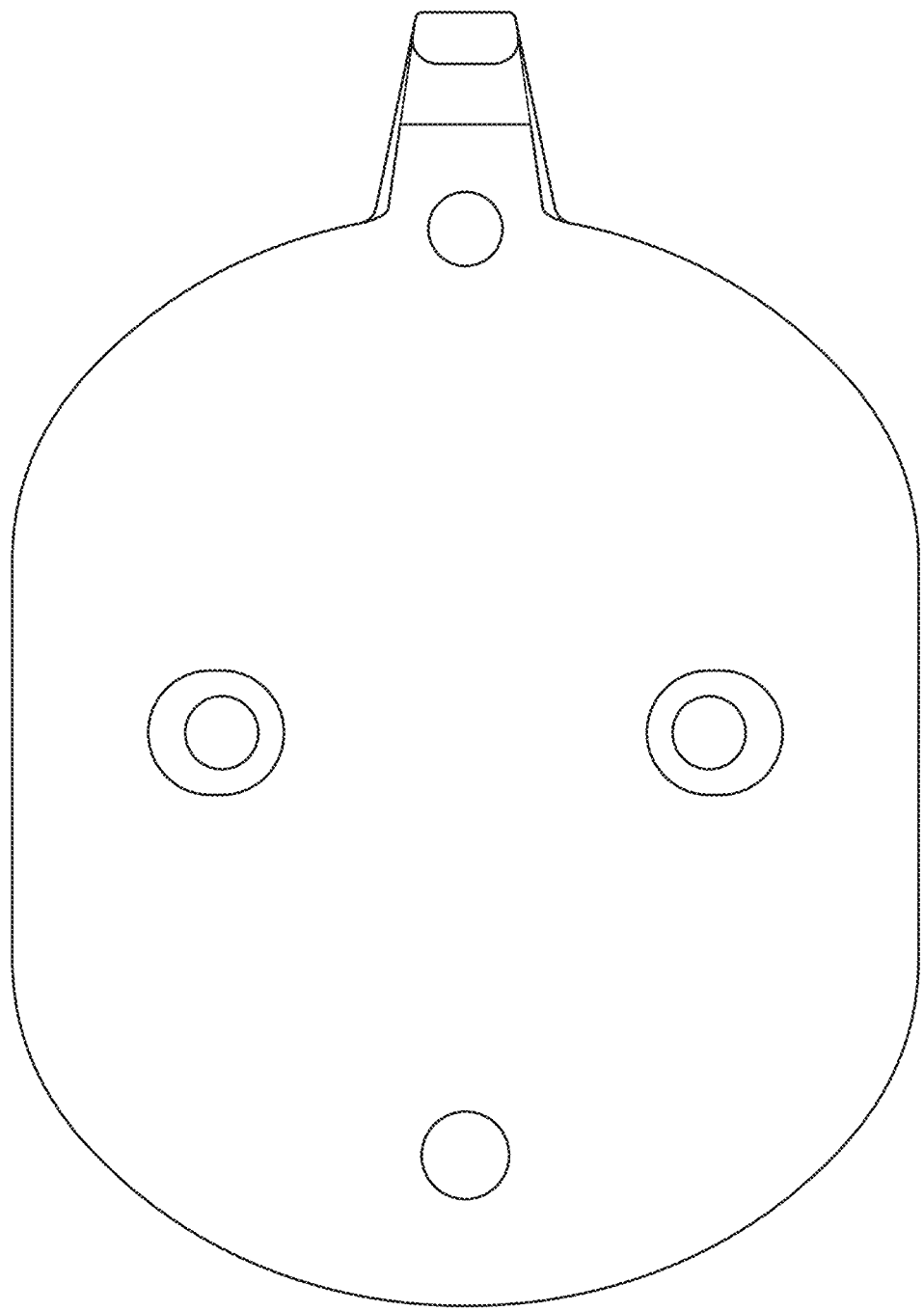
FIG. 12 is a rear view of the other embodiment of the wall and/or ceiling mount.

FIG. 9 is a perspective view of the other embodiment of the wall and/or ceiling mount in use.

Against this background, one or more embodiments of the present invention provide a wall and/or ceiling mount, in particular for hammocks and hanging seat arrangements, which wall and/or ceiling mount is easily attached to the wall, and at the same time permits easy handling during the fastening of a loop end of a fastening rope to said wall mount and, in addition, can absorb strong loads under tension. In addition, the intention is to ensure that the wear to the loop end of the rope via the wall mount is kept low.

This is achieved by a wall and/or ceiling mount having the features of Claim 1. The subsequent dependent claims relate to advantageous refinements of embodiments of the invention.

The wall and/or ceiling mount according to one or more embodiments differs from other approaches in that it comprises a pair of angled receptacles for guiding a fastener through the mount and into a wall stud and/or ceiling support to which the mount is to be affixed. In particular, because of the angled nature of the angled receptacles, fasteners extending through the angled receptacles are able to interact with the wall stud more readily. In some embodiments, fasteners extending through the angled receptacles enter a portion of the wall stud whereas receptacles extending at right angles to the mounting surface would miss or only slightly engage with the wall stud or ceiling support.

The wall and/or ceiling mount according to one or more embodiments of the invention differs here in a plurality of structural features from other wall and ceiling mounts. In this case, one structural change is that, in contrast to the prior art, the cable end is now not introduced centrally into the wall mount, but rather is introduced into the wall mount by a receptacle opening in a curved manner on the lower side of the wall mount, and re-emerges here centrally from the wall mount. This is precisely the opposite to the arrangement of the rope in other approaches, in which the free rope loop end is introduced centrally and led out again on the upper side toward the wall.

The loop end now re-emerging centrally from the wall mount can therefore, be more easily grasped than was possible in the prior art. In other approaches, the cable had to be guided along upward somewhat laboriously between wall and wall mount, wherein the gap between the wall and wall mount had very narrow dimensions, and therefore even a supporting grasping of the rope from above was possible only with difficulty. There is now a wide channel guide within the wall mount, wherein the frontally emerging loop end can easily be grasped by the user and therefore the guiding of the rope through the wall mount can be assisted.

Since the loop end now exits, according to the invention, on the front side and centrally from the wall and/or ceiling mount, the guiding and fastening of said loop end to the wall and/or ceiling mount has also changed. In other approaches, the free loop end was placed over a fastening body and tightened from the rear side of the wall and/or ceiling mount to the front toward the user. The direction of pulling the loop placed around said fastening body was therefore directed from the user toward the wall, wherein the formation of the fastening body in said direction was readily possible.

The wall and/or ceiling mount according to one or more embodiments of the invention is now constructed in such a manner that the loop end is placed over a fastening region from the front side of the wall and/or ceiling mount, wherein it has to be ensured that the loop end can no longer slide away from said fastening position, for which purpose a hook-shaped retaining lug is provided on the fastening region. Another improvement of one or more embodiments is that a pulling action on a fastening body no longer takes place in the wall mount. On the contrary, the loop is placed onto the fastening region of the wall and/or ceiling mount from the front, said fastening region at the same time serving as a receptacle for the third screw fastening.

This association of the function of the fastening region for the rope loop with the receptacle of the screw brings about an additional stabilization of the wall mounts. The pulling direction of the loop section acting on the wall mount is now no longer directed at a fastening body, but rather leads downward parallel to the wall or ceiling, wherein the forces can therefore be fully absorbed by the retaining screws fastened in the wall mount.

This fastening region of the wall mount does indeed have an approximately hook-shaped retaining lug which, however, is intended to fix the loop end in its position. It is a substantial difference from the prior art that said hook-shaped retaining lug has to absorb only very small, laterally acting forces, since the pulling direction of the rope or of the loop end is not directed toward said hook-shaped element, but rather runs parallel to the surface of the wall and/or ceiling mount and therefore to the fastening wall or ceiling. A problem of the tensile loading on a fastening body which may break off from the mount under too great a load is therefore reduced and/or completely solved in this novel construction. As far as the possible weight loading is concerned, the novel wall and/or ceiling mount is therefore dependent on the plugged joint and the structure of the wall or ceiling supporting said plugged joint, and no longer on the load-bearing capacity of the wall and/or ceiling mount itself.

The fastening region in which the rope loop rests expediently has at least one depth which corresponds to the thickness of the rope to be laid thereon. At the same time, the hook-shaped retaining lug is intended likewise to have at least one height, starting from said fastening region, that ensures that the rope which is laid thereon cannot readily slide away. In an expedient embodiment, said height corresponds approximately to the rope thickness used, wherein the retaining lug is designed in such a manner that it engages over the rope loop on the upper side, i.e., the rope loop is inserted into the resulting, approximately U-shaped receptacle.

In an advantageous refinement of the wall and/or ceiling mount, the wide receptacle for the introduction of the loop-like end of the rope is located on the lower side of the wall and/or ceiling mount. Said receptacle is laterally bounded by receptacles in the wall and/or ceiling mount for two lower fastening screws, wherein a stably designed, approximately curved connecting region between said screw receptacles spans the receptacle for the loop end. It is expedient here to form said curved section of the wall and/or ceiling mount as an element which is of strong design, since said structural element, depending on the course of the rope, absorbs the main load of the tensile forces when attached to a vertical wall and in particular when attached to horizontally extending building ceiling. This is provided in particular in the case of a ceiling suspension, since this region then serves as a deflecting region for the fastened rope from the horizontal course in the wall and/or ceiling mount toward the vertical course to the suspended object.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A wall and/or ceiling mount for receiving a fastening rope, the mount comprising:
    a body having a front and rear surface, the body having formed therein:
        three or more receptacles for removably securing the mount to a wall or ceiling, at least one of the three or more receptacles being an angled receptacle, at least one of the three or more receptacles being located a distance away from a line between two of the three or more receptacles;
        a receiving opening arranged on a lower side between at least two receptacles of the three or more receptacles;
        a rope guide running in the mount; and
        an outlet opening in the rope guide arranged frontally and approximately centrally on the mount, and
    the body further having formed thereon:
        a fastening region for the releasable fastening of the fastening rope,
        a curved connecting region spanning between at least two receptacles of the three or more receptacles, and
        a lower connecting region opposite the curved connecting region, the receiving opening being between the lower connecting region and the curved connecting region,
    wherein
        the fastening region is formed above said outlet opening.

2. The wall and/or ceiling mount as claimed in claim 1, wherein the rope guide in the mount is formed from lateral walls of at least one of the three or more receptacles, the curved connecting region and the rear surface of the mount.

3. The wall and/or ceiling mount as claimed in claim 1, wherein:
    at least one receptacle of the three or more receptacles is located at an upper end of the body, and
    wherein
        the portion of the body in which is formed the receptacle located at the upper end of the body protrudes from the front surface of the body in relation to the outlet opening and forms set-back guide regions,
        the set-back guide regions are at a shorter distance to the rear surface than the distance to the rear surface of a portion of the receptacle located at the upper end of the body in the front surface, and
        the set-back guide regions are on opposite sides of the receptacle located at the upper end of the body.

4. The wall and/or ceiling mount as claimed in claim 1, wherein at least two of the three or more receptacles are angled receptacles and wherein the angled receptacles extend through the mount at an angle ranging from 15 to 75 degrees with respect to the rear surface of the mount.

5. The wall and/or ceiling mount as claimed in claim 1, wherein at least two of the three or more receptacles are angled receptacles and wherein the angled receptacles extend through the mount at an angle ranging from 30-60 degrees with respect to the rear surface of the mount.

6. The wall and/or ceiling mount as claimed in claim 1, wherein at least two of the three or more receptacles are angled receptacles and wherein the angled receptacles extend through the mount at an angle of 60 degrees with respect to the rear surface of the mount.

7. The wall and/or ceiling mount as claimed in claim 1, wherein at least two of the three or more receptacles are angled receptacles and wherein a centerline through each angled receptacle intersects at least one centerline of another angled receptacle at a point below the rear surface of the mount.

8. The wall and/or ceiling mount as claimed in claim 1, wherein at least two of the three or more receptacles are angled receptacles and wherein the angled receptacles are between an outer edge of the mount and at least one receptacle.

9. The wall and/or ceiling mount as claimed in claim 1, wherein a center of an opening corresponding to the intersection of a first receptacle of the three or more receptacles with the rear surface of the mount is separated from a center of an opening corresponding to the intersection of a second receptacle of the three or more receptacles with the rear surface of the mount by a separation distance, the separation distance ranging from 1.5 to 2.75 inches in length.

10. The wall and/or ceiling mount as claimed in claim 9, wherein the separation distance is 1.5 inches in length.

11. The wall and/or ceiling mount as claimed in claim 1, further comprising a receptacle at a lower portion of the mount.

12. The mount as claimed in claim 1, wherein the three or more receptacles is at least two angled receptacles and at least two receptacles, the at least two angled receptacles being located on a first line and the at least two receptacles being located on a second line, the first line being perpendicular to the second line.

13. The mount as claimed in claim 1, wherein the three or more receptacles is at least two angled receptacles and at least three receptacles, the at least two angled receptacles being located on a first line and at least two of the at least three receptacles being located on a second line, the first line being parallel to the second line.

* * * * *